United States Patent Office 3,423,481
Patented Jan. 21, 1969

3,423,481
DIFFICULTLY DYEABLE POLYMERS CONTAINING COPOLYMERS OF ETHYLENICALLY UNSATURATED MONOMERS CONTAINING GLYCIDYL GROUPS
Yukio Mizutani, Tokuyama-shi, Japan, assignor to Tokuyama Soda Kabushiki Kaisha, Tokuyama-shi, Yamaguchi-ken, Japan, a corporation of Japan
No Drawing. Filed Feb. 7, 1966, Ser. No. 525,296
Claims priority, application Japan, Feb. 9, 1965, 40/6,791; May 15, 1965, 40/28,204
U.S. Cl. 260—836          10 Claims
Int. Cl. C08g 39/10; C08f 29/56; C08f 29/10

ABSTRACT OF THE DISCLOSURE

A polymeric composition of improved dyeability comprising a difficultly dyeable polymer containing uniformly dispersed therein spheroidal particles of a diameter below one micron of a cross-linked copolymer of (1) an ethylenically unsaturated monomer containing a glycidyl group and (2) a diethylenically unsaturated vinyl monomer having no other functional group, e.g., divinyl benzene.

---

This invention relates to compositions and shaped articles thereof of difficultly dyeable polymers, such as polyolefins, whose dyeability has been improved; and also to a process for preparing the same. More particularly, this invention relates to polymeric compositions consisting of difficultly dyeable polymers in which have been incorporated in a uniformly dispersed state spheriodal particles of a polymer of crosslinked structure having a functional group capable of covalently bonding with a functional group of a dyestuff (hereinafter referred as the reactive polymers).

It has been generally known to improved the dyeability of difficultly dyeable polymers by blending therewith a polymer having affinity for dyestuffs. However, although the dyeable polymer used in the foregoing method is a meltable linear polymer, it is not compatible with the difficultly dyeable polymer, with the consequence that a perfect polymer alloy is not formed between the two polymers, but the dyeable polymer is merely present in the difficultly dyeable polymers as particles which have coarsened. The reason for this is because when such a polymeric composition is submitted to a melting step of the molding or spinning operation, the dyeable polymer collects and fuses to become coarse because of a difference in the surface tension of the two polymers, and hence a uniform dispersion cannot possibly be expected. When a nonhomogeneously mixed polymeric composition such as this is, say, spun, the dyeable polymer occupies nearly half of the section of the filament, and as a result the yarn tenacity is reduced extremely and hence becomes frequently the cause of yarn breakage. On the other hand, when such a polymer blend is made into shaped articles, the dyeable polymer becomes progressively coarser on each occasion it is subjected to a melting step, and this results in a tendency to occurrence of spotty dyeing.

In addition, since the foregoing dyeable polymer is usually readily soluble in various solvents, its elusion readily takes place upon its contact with such solvents. Hence, colorfast dyeing of such a fiber cannot possibly be expected.

It is also known heretofore to grind a cation exchange resin into fine particles of below 10 microns and adding this to the difficultly dyeable polymers such as polyolefins (e.g. Japanese patent application publication No. 18,264/62). In this case, since the ion exchange resin used is one having a crosslinked structure, the phenomena such as coarsening of the dyeable polymer when melting the polymeric composition and the elusion of the dyeable polymer by means of solvents can be prevented. However, the cation exchange group in said resin is inferior as to its heat stability and partial heat decomposition occurs generally when 100° C. is exceeded to become the cause of undesirable discoloration. Again, there is the shortcoming that either due to the moisture that is entrained because of the hygroscopicity resulting from the cation exchange group or due to the decomposition gas evolving during the melt-molding operation, the transparency of the shaped polymer not only is not maintained but its tenacity also declines to a marked degree. In addition, the capacity of most of the cation exchange groups to bond with the dyestuffs is weak. For example, those dyed with the basic or disperse dyestuffs such as Brilliant Green GX, Celliton Blue Extra, etc., are decolored in practically all instances by means of organic solvents such as acetone. Thus, their colorfastness was not as yet satisfactory.

It is therefore an object of the present invention to impart level and fast dyeability to the shaped articles of difficultly dyeable polymers, without causing a decline in the physical properties of said shaped articles.

Another object of this invention is to provide a polymeric composition of improved dyeability wherein the incorporated dyeable polymer particles do not collect and become coarse during the melt-molding of the polymeric composition but remain uniformly dispersed in the difficultly dyeable polymer, and which, in addition, possesses a high degree of heat stability even at the elevated temperatures of said melt-molding operation.

A still another object of this invention is to provide a polymeric composition having great colorfastness as a result of the dyestuff molecules being firmly bonded by means of a covalent bond with the dyeable polymer particles dispersed in the difficultly dyeable polymer, during the dyeing of the shaped polymeric composition.

A further object of the invention is to provide a method of improving the dyeability of difficultly dyeable polymers in which this improvement is capable of being carried out very easily without the need for any complicated operations.

Other objects and advantages of the present invention will be apparent from the following description.

These objects of this invention are achieved in accordance with this invention by a polymeric composition of improved dyeability which comprises a difficultly dyeable polymer wherein is contained in a uniformly dispersed state spheroidal particles of below one micron in diameter of a polymer having a functional group which does not decompose at the shaping temperature of said difficultly dyeable polymer, said functional group being capable of covalently bonding with a functional group of a dyestuff, and said polymer having the functional group being of crosslinked structure.

The term "difficultly dyeable polymer," as used herein and the appended claims, refers to those polymers which do not exhibit affinity for dyestuffs; namely the polyolefins such as polyethylene and polypropylene, polyesters such as polyethylene terephthalate and polyethylene terephthalate-isophthalate, polyacrylonitrile, polyvinyl chloride, polyvinylidene chloride and the copolymers thereof; and the polymers whose affinity for dyestuffs is small such as polystyrene, polyacrylic acid esters, polymethacrylic acid esters and the styrene-acrylonitrile copolymer. When these difficultly dyeable polymers are dyed by means of the usual methods of dyeing, either they are not dyed at all, or even though they seemingly may be dyed, the dye is readily extracted with a detergent or solvent.

These difficultly dyeable polymers can, of course, contain in accordance with known prescriptions such additives as antioxidants, ultraviolet absorbents, delustrants, fillers and plasticizers.

According to this invention, with these difficultly dyeable polymers are blended spheroidal particles of a diameter of below one micron of a polymer having a functional group which does not decompose at the shaping temperature of said difficultly dyeable polymers, said functional group being capable of covalently bonding with functional groups contained in dyestuffs and said polymer having the functional group being of crosslinked structure.

The functional group contained in the aforesaid spheroidal polymeric particles must be one which reacts with such as the amino, hydroxyl and carboxyl groups, etc., present in the dyestuff molecules to form an attachment of the nature of a covalent bond and it also must be one which does not thermally decompose at the shaping temperature of the difficultly dyeable polymer. Hence, this functional group must be chosen in consideration of the shaping temperature of the difficultly dyeable polymer to be blended, i.e. its melting temperature, and the class of dyestuff to be used.

Now, if the classes of difficultly dyeable polymers and the functional groups which can be used therewith are shown, they are as follows:

For example, in the case of the difficultly dyeable polymers having a relatively high melt-molding temperature, e.g. polyolefins such as polyethylene and polypropylene, polyesters such as polyethylene terephthalate, polyethers such as polyoxymethylene and vinylidene polymers such as polyvinylidene chloride, the polmeric particles having a functional group such as an epoxy group and the maleic anhydride unit can be used. In the case, for example, of polystyrene and polyvinyl chloride or the difficultly dyeable polymers which can be formed by the wet molding means, e.g. polyacrylonitrile and polyvinyl chloride, useable are the polymeric particles having such functional groups as amino, isocyanate, carbamoyl and acid halide groups, in addition to the aforementioned functional groups.

However, of these functional groups, the heat stability of the epoxy group and maleic anhydride unit is the greatest, and hence the use of polymeric particles containing such a group is to be preferred, as they can be blended with any of the difficultly dyeable polymers, as desired. Of these, the epoxy group is especially suitable, as its bond with the dyestuff molecule is very readily accomplished.

When the functional group of the polymeric particles is the epoxy group and the maleic anhydride unit, it is believed that the following reactions take place between them and the dyestuff molecules.

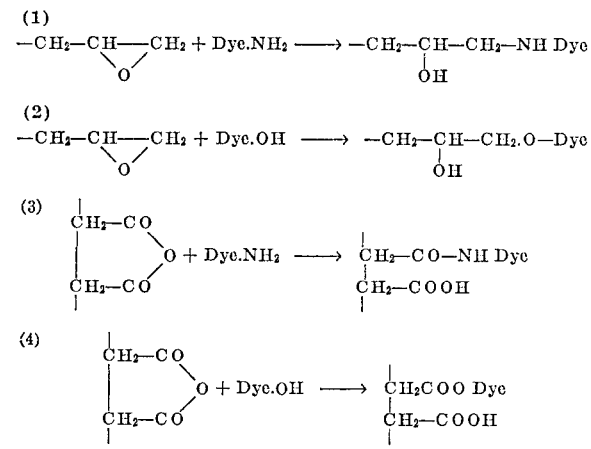

Hence, the dyestuff is firmly affixed chemically to the spheroidal particles which have been dispersed in the continuous phase of the difficultly dyeable polymer.

The polymeric spheroidal particles used in this invention have not only the foregoing functional group but also have a crosslinked structure. It is necessary for the polymeric spheroidal particles to have this crosslinked structure in order to prevent the coarsening of the particles during the melting of the polymeric composition when molding or spinning it and also to prevent its elusion upon contacting a solvent.

According to this invention, any polymer can be used, provided it has, as previously noted, a specific functional group in accordance with the melt-molding temperature of the dificultly dyeable polymer used and the class of dyestuff used, and in addition has a net structure resulting from chemical crosslinking. The use however of the polymeric spheroidal particles having a particle diameter of the order of 0.01–1 micron, as prepared in accordance with the method described in my copending United States patent application filed on Jan. 19, 1966, for "Process for Preparing Finely Divided High Polymers Having a Crosslinked Structure" as especially to be preferred. According to this method, the aforesaid vinyl monomer having a functional group, e.g. a compound having a vinyl group and an epoxy group, maleic anhydride unit, acid halide, carbamoyl and isocyanate groups, and a divinyl compound as the crosslinking agent, and if desired, other vinyl compounds capable of radical polymerization with the foregoing compounds, e.g. styrene, acrylonitrile, acrylic acid esters, methacrylic acid esters, vinyl chloride and vinyl acetate, are submitted to radical polymerization in an organic solvent, e.g. an aliphatic or aromatic hydrocarbon or aliphatic alcohol which has the property that it dissolves said monomeric system but does not dissolve the straight-chain polymer consisting of these monovinyl compounds.

It is possible in accordance with the foregoing method to obtain directly polymeric spheroidal particles having a uniform particle size of the order of a particle diameter 0.01–1 micron and which moreover have a crosslinked structure. It is not desirable for the size of the reactive polymeric particles to exceed one micron, since this results in a decline in the transparency and physical properties of the shaped articles or causes such troubles as the clogging of the spinning nozzle or yarn breakage.

The reactive polymer most suited for the purpose of this invention contains the aforesaid divinyl compound in an amount, based on the vinyl monomer, of at least 0.5% by weight, and preferably 0.5 to 30% by weight, and the aforesaid functional group-containing vinyl compound in an amount, based on the whole of the vinyl monomer, of at least 10 mol percent. When the divinyl compound is used in an amount, based on the vinyl monomer, of less than 0.5% by weight, there is a tendency for the size of the polymeric spheroidal particles to exceed one micron. And it is undesirable since there occurs a slight tendency to melting or to dissolving in solvents. On the other hand, when the molar ratio of the vinyl monomer having the reactive functional group becomes less than 10 mol percent, a great amount of the reactive polymeric particles must be blended for improving the dyeability, and this is undesirable for this results in a decline in the transparency and physical properties of the shaped articles.

Typical of the reactive polymers suitable in this invention include, e.g., the polymers containing epoxy group-containing vinyl compounds, such as glycidyl methacrylate/divinylbenzene, glycidyl acrylate/divinylbenzene, glycidyl methacrylate/styrene/divinylbenzene and glycidyl acrylate/arcylic acid alkyl ester/divinylbenzene; the polymers containing maleic anhydride unit such as maleic anhydride/divinylbenzene, maleic anhydride/styrene/divinylbenzene and maleic anhydride/acrylonitrile/divinylbenzene; the polymers containing vinyl isocyanate, such as vinyl isocyanate/divinylbenzene and vinyl isocyanate/styrene/divinylbenzene; the polymers containing acid halide-containing vinyl compounds, such as methacryloyl chloride/divinylbenzene, acryloyl chloride/divinylbenzene, and methacryloyl chloride/acrylonitrile/divinylbenzene; and the polymers containing a carbamoyl group-containing vinyl compound, such as acrylic acid amide/divinylbenzene and methacrylic acid amide/styrene/acrylic acid alkyl ester/divinylbenzene.

In the present invention, it is possible to use the finely divided polymer obtained by the method hereinbefore described in which the functional group, such as the epoxy group, maleic anhydride unit, isocyanate group and acid halide group, has been modified with an amino group by being reacted with an amino compound. In this case, the shaped articles exhibit improved dyeability by means of the acid dyes which were hitherto considered to be unsuitable for dyeing polyolefins. For this purpose, the amino compound can be chosen from the aromatic or aliphatic amino compounds such as ethylene diamine, ethanolamine, tetraethylene pentamine, phenylene diamine and aminophenol, which can be used either singly or in combinations of two or more.

In improving the dyeability of the difficultly dyeable polymers, the critical feature of this invention resides in the use of spheroidal particles of a diameter below one micron of a polymer having a crosslinked structure and containing a functional group which does not decompose at the shaping temperature of the difficultly dyeable polymer and which can form a covalent bond with functional groups of dyestuffs, for example, an epoxy group or maleic anhydride. The reason therefore is as follows. According to the concepts of the prior art, it was considered that the polymer to be added for improving the dyeability of the difficultly dyeable polymer could be any polymer so long as it had an affinity for the dyestuff. Thus, the concept, as in this invention, which holds that the polymer to be added must be one in which not only its physical configuration but also whose functional group must be fully stable thermally at the shaping temperature of the difficultly dyeable polymer and furthermore that the chemical structure of the functional group must be such that it is capable of forming a covalent bond with the functional group present in the dyestuff molecule, did not exist at all.

According to this invention, particles of a polymer having a specified functional group and having a crosslinked structure are used in accordance with the shaping temperature of the difficultly dyeable polymer used for this purpose and the class of the dyestuff used. Furthermore, it is specified that the polymeric particles must be spheroidal and of a particle diameter below one micron for facilitating the uniform dispersion of such polymeric particles in the difficultly dyeable polymer and for facilitating the operation of molding the composition.

In addition, when the finely divided polymer obtained by the method of the aforesaid copending application is used, the dispersion in the difficultly dyeable polymer can be accomplished very readily, because there is no tendency to flocculation between the particles as they do not have any impurities on their surface, such as the emulsifying agent.

Hence, the particles of the foregoing reactive polymer are contained uniformly dispersed in the continuous phase of the difficultly dyeable polymer in the invention polymeric composition.

The polymeric particles contained in the polymeric composition of the present invention can be varied in a range between 0.1% and 30%. At a content of less than 0.1%, fully satisfactory dyeing effects are unobtainable, whereas an addition of a large amount in excess of 30% causes a decline in the transparency and tenacity of the polymeric composition. Hence, the preferred range is between 0.1% and 10%, and particularly between 1% and 5%. Especially, in the case of polymers to be used for spinning, the addition of large amounts is undesirable.

For carrying out the addition and mixing of the aforesaid finely divided reactive polymer in the difficulty dyeable polymer, the known means of blending pigments, fillers, etc., in polymers can be employed without any change. As to the time at which the reactive polymer is mixed with the difficulty dyeable polymer, this also may be at any time as long as it is before the shaping operation. For illustrative purposes, typical methods of carrying out the mixing operation are described below.

(a) Methods of mixing the reactive polymer directly with the difficultly dyeable polymer.

There is a method of mixing the finely divided reactive polymer, as such, mechanically with the difficultly dyeable polymer which is in a form of either a powder, flakes or chips; or a method of accomplishing the mixing mechanically by using a solvent and forming a slurry first; or a method of mixing the finely divided reactive polymer into a solution or dispersion of the difficultly dyeable polymer, or the polymer in its molten state. In these instances, use can be made of a mixing tank, an extruder, a Banbury mixer or other types of mixers.

(b) A method of carrying out the polymerization in the presence of a difficultly dyeable polymer.

In preparing the finely divided reactive polymer by polymerizing the aforesaid vinyl compound in an organic solvent, the reaction is carried out in the presence in said solvent of a powder of a difficultly dyeable polymer. In this case, there is the advantage that the formation of the finely divided reactive polymer and the homogeneous mixing therewith of the difficulty dyeable polymer is accomplished concurrently.

In mixing the finely divided reactive polymer into the difficultly dyeable polymer, regardless of the mixing method used, it is preferable that a dispersing assistant, as usually used during the addition of a powdered substance, be used, such as, e.g., calcium stearate, stearin and stearylamine. Further, in the present invention, when the polymeric composition is heated to above the melting point of the difficultly dyeable polymer in obtaining said polymeric composition, the molecular weight can be thermally degraded. Hence, even though use is made of a difficultly dyeable polymer which is inferior in its processability on account of its low melt index because of its high molecular weight, by heating it to a temperature above its melting point, its melt index can be increased and the polymeric composition can be made into one having excellent processability.

The so obtained polymeric composition of this invention can be melt-spun or wet-spun by procedures known in the art and made into filaments or staples. Further, this polymeric composition can be made into shaped articles such as films, sheets, pipes, etc., by such means as melt-extrusion, blow molding and casting of the polymer solution.

The shaped articles composed of the invention composition, such as fibers and films, are readily dyed by a wide range of dyestuffs such as disperse, basic and acid dyes. Furthermore, since such dyes are chemically bonded to the reactive polymeric particles which have been uniformly dispersed in the composition, the colorfastness is exceedingly good, and it is hardly decolored even with cleaning solvents such as perchloroethylene.

The invention is further illustrated by means of the following examples, which are for illustrative purpose and not in limitation of the invention in any sense. All percentages and parts are on a weight basis, unless otherwise noted.

EXAMPLE 1

Thirty-two grams of styrene, 3.5 grams of divinyl benzene, 5 grams of maleic anhydride and 0.1 gram of benzoyl peroxide were heated to a temperature of 75–80° C. with stirring in 100 cc. of kerosene, and 25 grams of finely divided polymeric particles (particle size being not more than 0.1 micron) were obtained. Four parts of these particles and 96 parts of polypropylene powder were mixed well with stirring in methanol, filtered, dried, 0.2% of Ionol (a stabilizer) was added and the mixture was shaped into the form of pellets. The pellets were melt spun at 230° C. The obtained filaments were dyed red and violet well by dispersion dyestuffs of Daranol Red X3 and Estol Fast Violet B respectively.

The obtained particles of said reactive copolymer was heated to 80° C. in a 30% dioxane solution of ethylene diamine, washed with methanol and dried. As a result, finely divided polymeric particles containing 6.7% of nitrogen were obtained. Said particles were mixed with polypropylene same as mentioned above, the mixture was spun and dyed, and a good dyeing result was obtained as compared with filaments not having been treated with ethylene diamine. Also dyeability of this polypropylene fiber (filaments) with Wool Blue was improved.

EXAMPLE 2

This example shows comparison of the composition of this invention and a known composition added with a cation exchange resin.

(A) Three hundred and eighty grams of glycidyl methacrylate and 50 grams of divinyl benzene were polymerized at 80° C. for 3 hours with 10 grams of benzoyl peroxide as an initiator in 2.7 liters of n-heptane, and 330 grams of cross-linked finely divided particles were obtained. The majority of the particle sizes of said particles was within the range of 0.1±0.05 micron and and said particles were almost completely spherical.

Ether slurry of 5 parts of said particles was mixed with ether slurry of 95 parts of polypropylene powder completely passing a 30 mesh sieve, the mixture was filtered and then air dried for 2 days. To the dried mixture was added 0.4 part of antioxidant RA1093 as an ether solution. The mixture was dried in vacuo at room temperature for 24 hours, passed through an extruder at 200–230° C. and made pellets. Next, these pellets were shaped into a test piece and a tensile test thereof was carried out.

(B) In order to sufficiently smash commercially available polymerization-type sulfonic acid type cation exchange resin and polymerization-type carboxylic acid-type cation exchange resin, after drying the two, they were shaken for 10 hours and smashed in a stainless ball mill. According to measuring by an electron microscope, the smashed resins were amorphous and their particle size were, the sulfonic acid-type was 0.1–1 micron and carboxylic acid-type was 0.1–2 micron.

These particles were washed ether, respectively. Thereafter same as the aforesaid A these particles were mixed with polypropylene, being extruded in the form of pellets. At this occasion it was recognized that many foams were included in the pellets, at the same time, the transparency of the polymer composition was damaged, moreover, what had been blended with the sulfonic acid-type ion exchange resin discolored to yellowish brown. Next, these pellets were shaped into dumbell forms and tensile test thereof was carried out. In this case, the foams in the pellets were removed as much as possible.

(C) The results of comparative test of these compositions were as shown in Table 1 below.

TABLE 1

| Added resin | Adding amount, percent | Yield strength, kg./cm.² | Elongation, percent |
|---|---|---|---|
| Sulfonic acid-type | 5 | 230 | 28 |
| Carboxylic acid-type | 5 | 225 | 50 |
| According to the process of this invention | 5 | 280 | 670 |
| Polypropylene only | | 290 | 750 |

Further, when these samples were dyed in a hot acetone solution of Celliton Blue Extra and dyed, what had been blended with the carboxylic acid-type resin was dyed at a glance, but easily decolored by extraction with acetone, however, what had been blended with the sulfonic acid-type resin and what had been according to this invention did not decolor by extraction with acetone. However, what had been blended with the sulfonic acid-type resin was observed to be remarkably inferior to what had been according to this invention is clearness of the color of the dyed matter.

From the foregoing result it is understood that a polypropylene composition mixed with a smashed cation exchange resin is low in thermal stability, pyrolyzing upon shaping, the moisture and a decomposed gas being accompanied into the composition together with the resin, causing occurrence of foams and lowering of transparency and physical properties of the shaped article, and the obtained dyed matter is either low in dyeing fastness or lacking clearness of the color. In contrast thereto, the composition of this invention is not recognized to substantially lower in physical properties and the fastness of the dyed matter is very large as compared with the shaped article of polypropylene only.

EXAMPLE 3

When polypropylene filaments obtained by spinning according to Example 1 was heated to 80° C. for 2 hours in a dioxane solution of Celliton Blue Extra type to effect dyeing subsequently these dyed filaments were immersed in an aqueous solution of soap and heated for 1 hour on the water bath, clearly blue dyed filaments were obtained. When these filaments were refluxed and extracted by acetone, it was recognized that flowing out of the dyestuff was very slight and the fastness was excellent.

On the contrary, for the purpose of comparison when the similar experiment was conducted using polypropylene mixed with finely divided polymeric particles (0.1–0.5 micron) obtained by dissolving 24 grams of styrene, 3 grams of divinyl benzene and 0.2 gram of benzoyl peroxide in 100 cc. of kerosene and heated to 70–75° C. for 5 hours with stirring, by acetone extraction the dyestuff was completely extracted.

EXAMPLE 4

Twenty grams of acrylonitrile, 10 grams of glycidyl acrylate and 3 grams of divinyl benzene were dissolved in 150 cc. of kerosene and the mixture was heated to 70–75° C. for 4 hours with stirring, and 28 grams of high molecular weight finely divided polymeric particles (particle size being 0.1 micron or less) were obtained. Five parts of said particles were mixed with 95 parts of polyethylene, 0.2 part of Ionol (a stabilizer) and 0.5 part of calcium stearate, the mixture was shaped into a film of 0.1 mm. thickness and when the film was dyed same as in Example 1, a good dyeing result was obtained. When the dyed film was subjected to an acetone extraction, only slight flowing out of the dyestuff was seen.

EXAMPLE 5

This example explains that finely divided particles of a reactive polymer can improve the dyeability of various polymers.

Forty-four grams of glycidyl methacrylate and 7 grams of divinyl benzene were polymerized by using benzoyl peroxide at 80° C. in 400 cc. of kerosene. Three parts of the obtained finely divided polymeric particles (particle size being 0.05–0.1 micron) were added to viscous solution of 97 parts of various hardly dyeable polymer shown in the following Table 2 and sufficiently dispersed, thereafter the mixture was cast to produce films. When these films were dyed with Celliton Blue Extra type, good dyeabilities where shown. When these dyed films were extracted with a 1:3 mixed solution of acetone and methanol by using a Soxhlet extractor, only slight flowing out of the dyestuff was recognized. On the contrary what had not been added with the finely divided polymeric particles either did not show a good dyed result or the dyestuff thereof was almost completely extracted by a mixed solution of acetone and methanol.

The results were shown in Table 2.

For information, concerning polymethyl methacrylate and an acrylonitrile-styrene copolymer acetone was used, concerning polystyrene benzene was used, concerning polyacrylonitrile dimethylformamide was used and concerning polyvinyl chloride tetrahydrofuran was used, respectively.

TABLE 2

| Hardly dyeable high molecular compound | Dyeing situation | Discoloration by extraction with acetone-methanol |
|---|---|---|
| (a) Non-additive: | | |
| Polyacrylonitrile | Good | Mostly decolored. |
| Polyvinyl chloride | Bad | Completely decolored. |
| Acrylonitrile-styrene copolymer | Fair | Mostly decolored. |
| Polystyrene | Good | Do. |
| Polymethyl methacrylate | do | Do. |
| (b) Addition: | | |
| Polyacrylonitrile | do | Slightly. |
| Polyvinyl chloride | do | Do. |
| Acrylonitrile-styrene copolymer | do | Do. |
| Polystyrene | do | Do. |
| Polymethyl methacrylate | do | Do. |

EXAMPLE 6

Ten cc. of styrene, 10 cc. of glycidyl methacrylate, 3 cc. of divinyl benzene (50%) and 0.2 gram of benzoyl peroxide were added to 150 cc. of n-heptane and polymerized at 80° C. Five parts of the obtained finely divided polymeric particles (particle size being about 0.1 micron) and 0.5 part of calcium stearate were mixed with 100 parts of chipped polyethylene terephthalate, and the mixture was shaped into pellets by being passed through an extruder. Thereafter, the pellets were shaped into films by extrusion. When the films were dyed with Estrol Fast Orange GRUF a good result was obtained. These dyed films did not decolor by an acetone extraction. Concerning what was shaped into fibers, the similar result was obtained.

EXAMPLE 7

Fifty grams of polyvinyl chloride in the form of finely divided particles obtained by a suspension polymerization, 10 cc. of styrene, 10 cc. of glycidyl methacrylate, 3 cc. of divinyl benzene (50%) and 0.2 gram of benzoyl peroxide were added to 400 cc. of n-heptane, and the mixture was polymerized at 80° C. As a result, 62 grams of a uniform mixture of polyvinyl chloride and finely divided particles of a cross-linked copolymer of styrene and glycidyl methacrylate were obtained. This mixture was filtered and dried, thereafter, it was dissolved with stirring and heating in dimethyl formamide, the dissolved mixture was cast onto a glass plate, the solvent being removed under a reduced pressure and shaped into a film.

When the film was dyed with dyestuffs such as Estrol Fast Violet and Celliton Blue Extra, good dyeing results were obtained. The dyed film did not decolor at all by extraction with a 1:3 mixture of acetone and methanol.

EXAMPLE 8

When 190 grams of glycidyl methacrylate, 10 grams of divinyl benzene and 10 grams of benzoyl peroxide were polymerized at 80° C. for 3 hours in 2800 cc. of n-heptane, finely divided particles of cross-linked polyglycidyl methacrylate (particle size being 0.05–0.1 micron) were obtained at a yield of 82%. To polypropylene particles of below 30 mesh, 6.5% by weight of said particles was added, the mixture being extruded in a nitrogen atmosphere at a maximum temperature of 325° C. by using an extruder. The results of comparative test of melt index of what had been subjected to such mix treatment and what had not been blended were shown in the following table.

Situations of polypropylene used: MI
Non-blended polypropylene _____ below 0.01
When polypropylene was subjected to an extruder _____ 0.01
Polypropylene added with 6.5% of cross-linked polyglycidyl ester _____ 2.6

It is understood that by adding finely divided particles of cross-linked polyglycidyl ester, apparently the rate of thermal degradation has been increased.

When the polymer composition having been subjected to said treatment was shaped by extrusion into a film of 0.1 mm. thickness and the film was dyed with Estrol Fast Violet B, a good dyeing result was obtained. This dyed film did not decolor by an acetone extraction and it has been confirmed that the dyestuff was fixed in the high molecular weight composition.

EXAMPLE 9

Twenty grams of acryl amide, 3 g. of divinylbenzene and 0.4 g. of α,α'-azobisisobutyronitrile were added to 200 cc. of isopropyl alcohol, and the mixture of monomers was polymerised for 4 hours at 80° C. while agitating to form 17 g. of spherical fine particles of a high polymer having a particle size of about 0.1 micron. Seven percent of the said polymeric particles was added to a powdery polyacrylonitrile, and the mixture was dissolved into dimethylformamide to get a 17% solution. The solution was heated to 60° C. and was spun into ethylene glycol at room temperature to make filaments.

The obtained filaments were dyed in beautiful scarlet by Procinyl Scarlet. There was observed only a slight decolouration even when the dyed filaments were immersed in methanol.

I claim:

1. A polymeric composition of improved dyeability comprising a difficultly dyeable polymer selected from the group consisting of polyolefins, polystryene, polyesters, polyacrylonitrile, polyvinyl chloride and copolymers thereof containing from 0.01% to 30% by weight of spheroidal particles of a particle diameter below one micron of a cross-linked copolymer of (1) an ethylenically unsaturated monomer containing a glycidyl group and (2) based on the weight of (1) from 0.5% to 30% by weight of a diethylenically unsaturated vinyl monomer having no other functional group.

2. The polymeric composition of claim 1 wherein said cross-linked copolymer may additionally contain (3) an ethylenically unsaturated vinyl monomer having no other functional group.

3. A composition of claim 1 wherein said difficultly dyeable polymer is a polyolefin.

4. A composition of claim 1 wherein said difficultly dyeable polymer is polyethylene terephthalate.

5. A composition of claim 1 when said difficultly dyeable polymer is polyacrylonitrile.

6. A composition of claim 1 when said difficultly dyeable polymer is polyvinyl chloride.

7. A process for preparing a polymeric composition for shaping use whose dyeability as well as melt index has improved, said process comprising mixing in a difficultly dyeable polymer selected from the group consisting of polyolefins, polystyrene, polyesters, polyacrylonitrile, polyvinyl chloride and copolymers thereof from 0.1% to 30% by weight of spheriodal particles of a particle diameter below one micron of a cross-linked copolymer of (1) an ethylenically unsaturated monomer containing a glycidyl group and (2) based on the weight of (1) from 0.5% to 30% by weight of a diethylenically unsaturated vinyl monomer having no other functional group, and thereafter heating said composition to above the melting point of said difficultly dyable polymer.

8. The process of claim 7 wherein said cross-linked copolymer may additionally contain (3) an ethylenically unsaturated vinyl monomer having no other functional group.

9. The composition of claim 1 wherein said diethylenically unsaturated vinyl monomer having no other functional group comprises divinyl benzene.

10. The process of claim 7 wherein said diethylenically unsaturated vinyl monomer having no other functional group comprises divinyl benzene.

(References on following page)

References Cited

UNITED STATES PATENTS 3,301,919   1/1967   Cenci _____ 260—836

OTHER REFERENCES

Kubota et al., Kogyo Kagaka Zasshi 66(5) 725–729 (1963) as cited in Chemical Abstracts, vol. 60, p. 6972 c,d (1964.)

Chemical Abstracts 62, 14,911 c,d (1965), cited therein Fu, 1,380,061 January 1964. Note British Equivalent Br. 1,003,935.

MURRAY TILLMAN, *Primary Examiner.*

PAUL LIEBERMAN, *Assistant Examiner.*

U.S. Cl. X.R.

260—873, 2.2, 896, 2.1, 897, 78.5, 898, 86.1, 899, 80.72, 901, 80.73, 874, 23, 23.7